R. DUNNING.
OIL DRILL.
APPLICATION FILED JULY 24, 1919.

1,326,327.

Patented Dec. 30, 1919.
2 SHEETS—SHEET 1.

INVENTOR.
Robson Dunning
BY Walter Ward
ATTORNEYS.

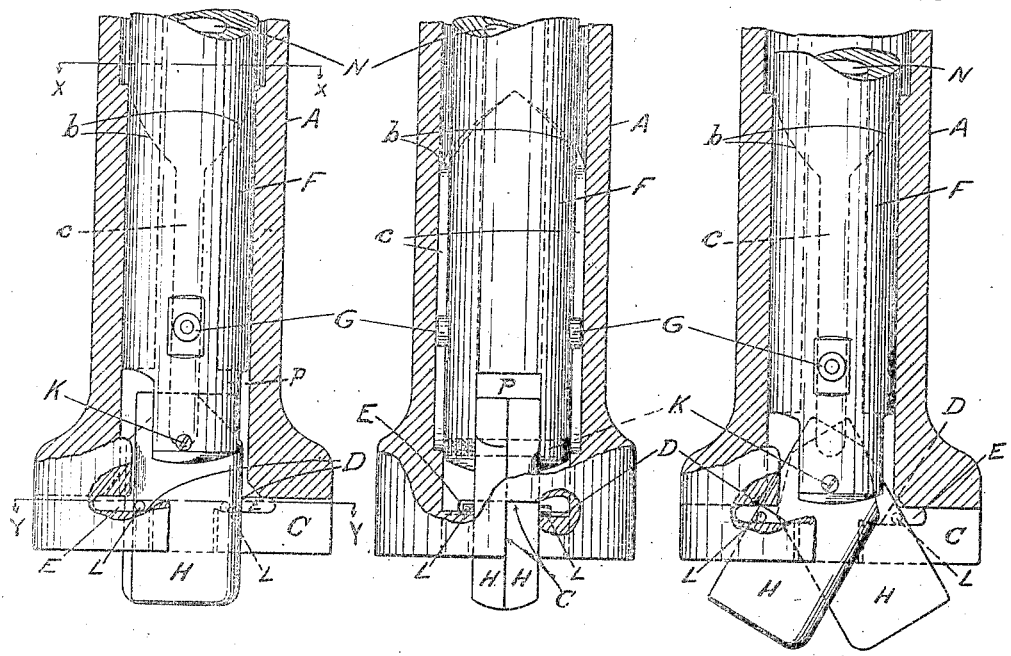
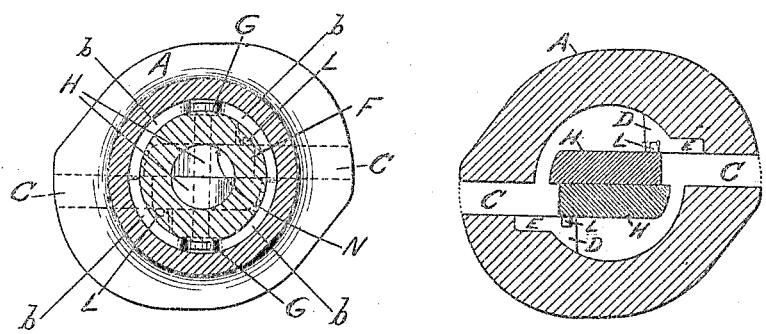
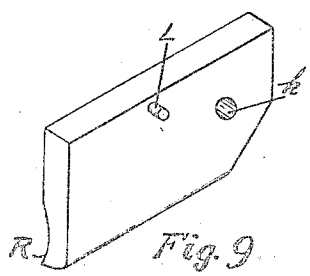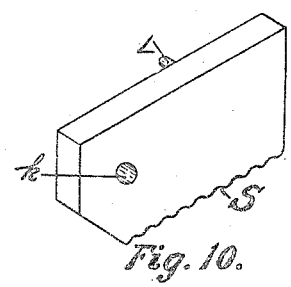

UNITED STATES PATENT OFFICE.

ROBSON DUNNING, OF SCHENECTADY, NEW YORK.

OIL-DRILL.

1,326,327.    Specification of Letters Patent.    Patented Dec. 30, 1919.

Application filed July 24, 1919. Serial No. 313,054.

*To all whom it may concern:*

Be it known that I, ROBSON DUNNING, a citizen of the United States, residing at the city of Schenectady, in the county of Schenectady and State of New York, have invented certain new and useful Improvements in Oil-Drills, of which the following is a specification.

My invention relates to well drilling apparatus, particularly such as is employed in sinking oil wells.

In drilling oil wells, which often run to enormous depths, it is frequently necessary to remove the drill, either for sharpening, repairing or replacing the cutters, or for other purposes. The present mode of performing this operation is to "pull" the drill tube until the head is clear of the bore. This operation is expensive, both in the cost of labor and in lost drilling time, and the object of my invention is to construct a drill head, cutter and cutter bar, in such a manner that the cutters may be removed from and replaced in the drill head without removing the drill head from the bore of the well.

I accomplish this object by means of the mechanism illustrated in the accompanying drawings, in which—

Figs. 4, 5 and 6 are vertical cross sections of the lower end of the drill head illustrating my method of putting the cutters in place.

Fig. 7 is a horizontal cross section, along the line X—X on Fig. 4.

Fig. 8 is a horizontal cross section along the line Y—Y on Fig. 4.

Figs. 9 and 10 are perspective views of two of the many types of cutters which may be used with my drill head and cutter bar.

Similar letters refer to similar parts throughout the several views.

Figure 2:
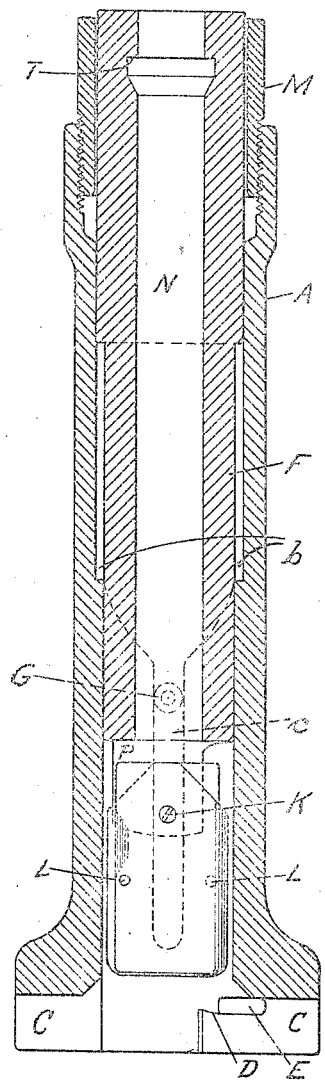
Fig. 2 is a vertical section through the drill head and cutter bar showing the position of the cutters when being lowered into the drill head.

Referring to the drawings, A is a cylindrical drill head, the upper end of which is preferably provided with screw threads adapted to engage with similar threads on the end of the drill tube M, the lower end of the drill head A is enlarged to form a working face in which are provided the cutter slots C, C and adapted to receive and drive the cutters H, H.

The opening through the lower part of the drill head is restricted and in this extra thickness of wall are formed the grooves $c, c$ flared at their upper ends to form the inclined surfaces $b, b$. At the lower end of this restricted opening adjacent to the working face, are lugs forming the shelves D, D and slots E, E are provided, the lower edge of the slots E, E being on a line with the top of the shelves D, D. (See Figs. 2, 3, 4, 5, 6, and 8.)

The cutter bar F is adapted to fit loosely inside the drill head A and has an opening N throughout its length. Across the lower end of the cutter bar is formed the slot P adapted to receive the cutter blades H, H. A suitable hinge pin K is provided to fasten the cutters into the cutter bar. Guide rollers G, G are mounted opposite each other on the outside of the cutter bar. The cutter bars H have a hole $k$ adapted to engage loosely the hinge pin K and a guide pin L adapted to engage the shelf D and slot E.

In boring oil wells the method pursued is to mount the drill head on a hollow drill rod or tube, somewhat smaller than the bore to be made, and as the boring progresses to add additional length to the drill tube by coupling on extra pieces of tubing. Water is forced through the drill tube, and suitable openings in the drill head, to carry the matter loosened by the drill up to the surface. In other words, water is forced down through the drill tube and rises to the surface outside of the tube carrying with it the matter loosened by the drill.

It will readily be seen that in order to change or replace a drill cutter when the cutter is a part of, or rigidly fastened to, the drill head would require the drill head to be raised to the surface, entailing the dismembering of the drill tube and consequent re-assembly before the work can go on. With my device all this labor is unnecessary.

The drill head A is fastened to the bottom of the drill tube M in the usual manner. The cutter bar F, carrying the cutter blades, is then lowered into the cutter head. The guide rollers G, G engage two of the inclined surfaces $b, b$ and cause the cutter bar to rotate until said rollers enter the grooves $c$, $c$. The grooves $c$, $c$ and guide rollers G, G being so placed that when they are in engagement the cutter blades are in alinement with the cutter driving slots C, C in the work face of the drill head. (See Figs. 3, 5, 7 and 8).

Figure 1:
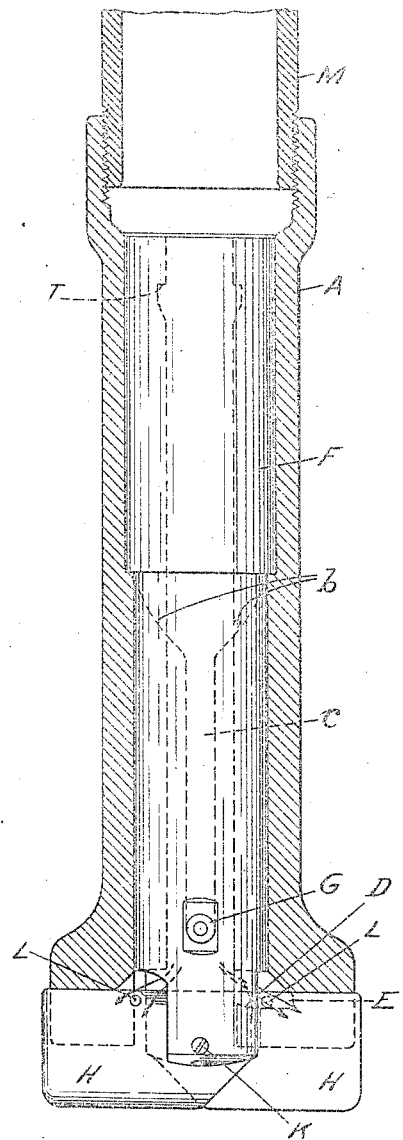
Figure 1 is a vertical section through the drill head showing the cutter bar and cutters in operating position.
Figure 3:
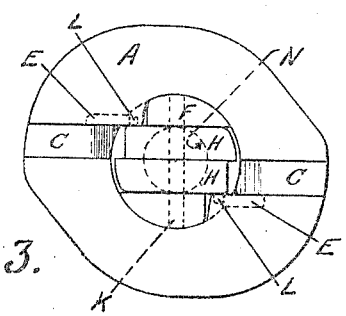
Fig. 3 is an inverted plan of the drill head, cutters in position, shown in Fig. 2.

When the cutter bar has been lowered to the position shown in Figs. 4 and 5 the guide pins L, L in the cutter blades H, H come into contact with the shelves D, D. The guide pins L, L coming into contact with the shelves D, D prevent further downward motion of the cutter blades, of which they form a part, and being off center a further dropping of the cutter bar will cause the pins to slide along the shelves D, D and so cause the cutter blades to rotate on the hinge pin K (see Fig. 6) and finally to assume the working position shown in Fig. 1. The slots E, E provide for the side motion of the guide pins L, L.

It will be seen that in order to remove the cutter blades it will only be necessary to "pull" the drill tube enough to free the drill head from the bottom of the bore, drop a suitable hook down the tube to engage the cutter bar; a shoulder T is provided to facilitate this, and pull the cutter bar and cutters to the surface, change or replace the cutters, and lower into place, disconnect and remove the hook, lower the drill tube to the bottom and proceed with the drilling.

As thus arranged the device is simple, inexpensive, and extremely economical in operation, will be very durable in that it permits the easy substitution of different types of cutting blades to meet the varying formations encountered in deep well drilling.

What I claim as my invention and desire to secure by Letters Patent is—

In well drilling apparatus, a hollow drill head having guiding ledges formed therein, a cutter bar, cutter blades hinged in said cutter bar, a projection on each of said cutter blades adapted to engage with a guiding ledge in said drill head and cause the cutter blade to turn on said hinge and come into engagement with said drill head, substantially as described and for the purposes set forth.

In testimony whereof I have affixed my signature in the presence of two witnesses.

ROBSON DUNNING.

Witnesses:
WALTER E. WARD,
MINNIE MONTANYE.